US012418066B2

(12) United States Patent
Park

(10) Patent No.: US 12,418,066 B2
(45) Date of Patent: Sep. 16, 2025

(54) BATTERY MODULE HAVING IMPROVED ENERGY DENSITY AND BATTERY PACK INCLUDING THE SAME

(71) Applicant: LG ENERGY SOLUTION, LTD., Seoul (KR)

(72) Inventor: Yoon Woo Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 630 days.

(21) Appl. No.: 17/788,412

(22) PCT Filed: Nov. 26, 2020

(86) PCT No.: PCT/KR2020/016905
§ 371 (c)(1),
(2) Date: Jun. 23, 2022

(87) PCT Pub. No.: WO2021/182716
PCT Pub. Date: Sep. 16, 2021

(65) Prior Publication Data
US 2023/0035203 A1   Feb. 2, 2023

(30) Foreign Application Priority Data
Mar. 12, 2020   (KR) .................. 10-2020-0030584

(51) Int. Cl.
*H01M 50/204*   (2021.01)
*H01M 50/505*   (2021.01)
*H01M 50/557*   (2021.01)

(52) U.S. Cl.
CPC ....... *H01M 50/204* (2021.01); *H01M 50/505* (2021.01); *H01M 50/557* (2021.01)

(58) Field of Classification Search
CPC ........... H01M 2220/20; H01M 50/204; H01M 50/209; H01M 50/249; H01M 50/289;
(Continued)

(56) References Cited

U.S. PATENT DOCUMENTS

2009/0325059 A1   12/2009   Niedzwiecki et al.
2012/0052359 A1   3/2012   Yoshitake et al.
(Continued)

FOREIGN PATENT DOCUMENTS

CN   107710450 A   2/2018
CN   211062766 U   7/2020
(Continued)

OTHER PUBLICATIONS

Machine translation KR20140147555A (Year: 2014).*
(Continued)

*Primary Examiner* — Victoria H Lynch
(74) *Attorney, Agent, or Firm* — Birch, Stewart, Kolasch & Birch, LLP

(57) ABSTRACT

A battery module includes a unit module stack, in which unit modules, each of which includes one or more battery cells and a cell cartridge configured to receive the battery cells therein, are horizontally or vertically stacked on the basis of the ground; a pair of insulation sheets located at outermost sides of the unit module stack; and a pair of end plates located outside the pair of insulation sheets, wherein each of the pair of end plates is provided with a first protuberance protruding in a direction in which the unit module stack is located, and each of the pair of insulation sheets is provided with a first receiving portion configured to receive the first protuberance of a corresponding one of the end plates, the first receiving portion having an identical shape to the first protuberance, and a battery pack including the same.

17 Claims, 11 Drawing Sheets

(58) Field of Classification Search
CPC ............. H01M 50/291; H01M 50/505; H01M 50/557; Y02E 60/10
See application file for complete search history.

(56) References Cited

U.S. PATENT DOCUMENTS

| | | |
|---|---|---|
| 2015/0064546 A1 | 3/2015 | Murakami et al. |
| 2016/0141712 A1 | 5/2016 | Choi et al. |
| 2017/0141365 A1 | 5/2017 | Kim et al. |
| 2017/0194681 A1 | 7/2017 | Kim et al. |
| 2017/0309869 A1 | 10/2017 | Kim et al. |
| 2017/0358784 A1 | 12/2017 | Jeong et al. |
| 2018/0040863 A1 | 2/2018 | Kim et al. |
| 2018/0159096 A1 | 6/2018 | Kim et al. |
| 2021/0036270 A1 | 2/2021 | Motohashi et al. |
| 2021/0305646 A1 | 9/2021 | Kubota et al. |
| 2023/0098629 A1 | 3/2023 | Fukuda et al. |

FOREIGN PATENT DOCUMENTS

| | | |
|---|---|---|
| CN | 211320161 U | 8/2020 |
| EP | 3 168 899 A1 | 5/2017 |
| JP | 2011-528729 A | 10/2011 |
| JP | 2014-10983 A | 1/2014 |
| JP | 2015-50067 A | 3/2015 |
| JP | 2015-111493 A | 6/2015 |
| JP | 2016-46207 A | 4/2016 |
| JP | 2018-46233 A | 4/2016 |
| JP | 2018-54130 A | 4/2018 |
| JP | 2018-56087 A | 4/2018 |
| JP | 2019-186040 A | 10/2019 |
| JP | 2020-107462 A | 7/2020 |
| KR | 10-2012-0022922 A | 3/2012 |
| KR | 10-2014-0147555 A | 12/2014 |
| KR | 10-2015-0115251 A | 10/2015 |
| KR | 10-2015-0137262 A | 12/2015 |
| KR | 10-2017-0065864 A | 6/2017 |
| KR | 10-2017-0138746 A | 12/2017 |
| WO | WO 2019/198518 A1 | 10/2019 |
| WO | WO 2021/199493 A1 | 10/2021 |

OTHER PUBLICATIONS

Extended European Search Report for European Application No. 20923951.6, dated Dec. 20, 2023.
International Search Repori (PCT/ISA/210) issued in PCT/KR2020/016905 mailed on Mar. 3, 2021.

* cited by examiner

[FIG. 1]
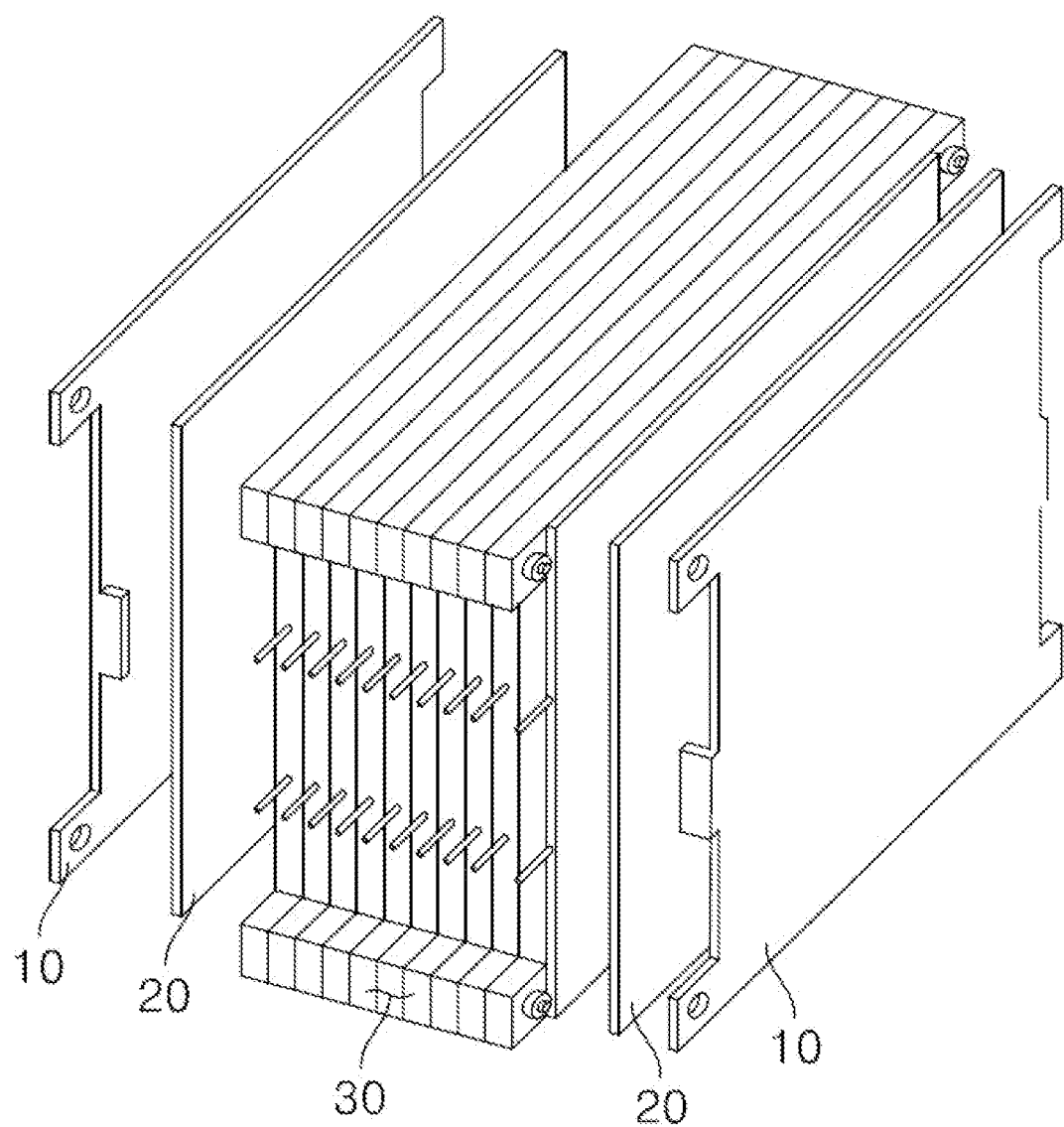

[FIG. 2]
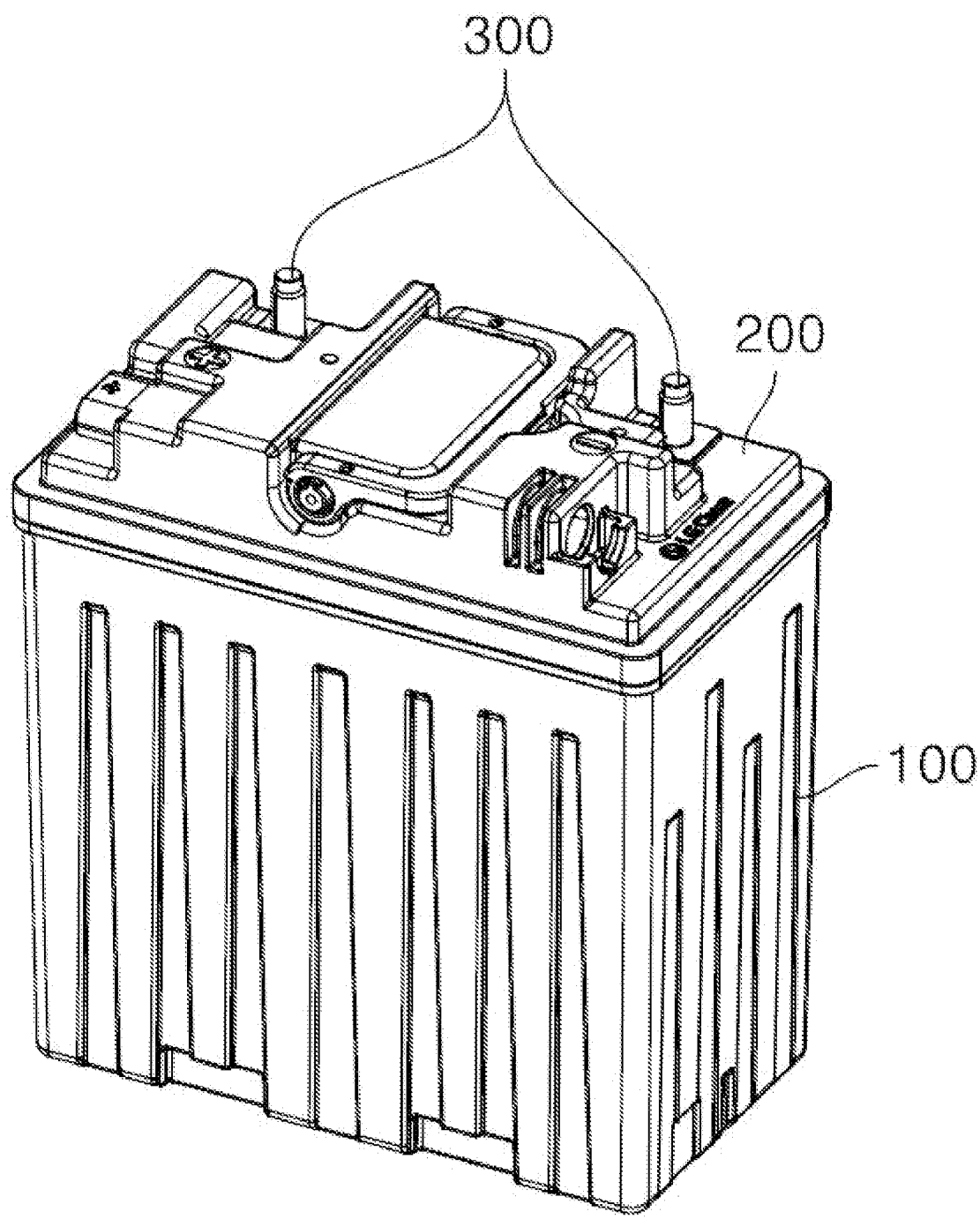

【FIG. 3】
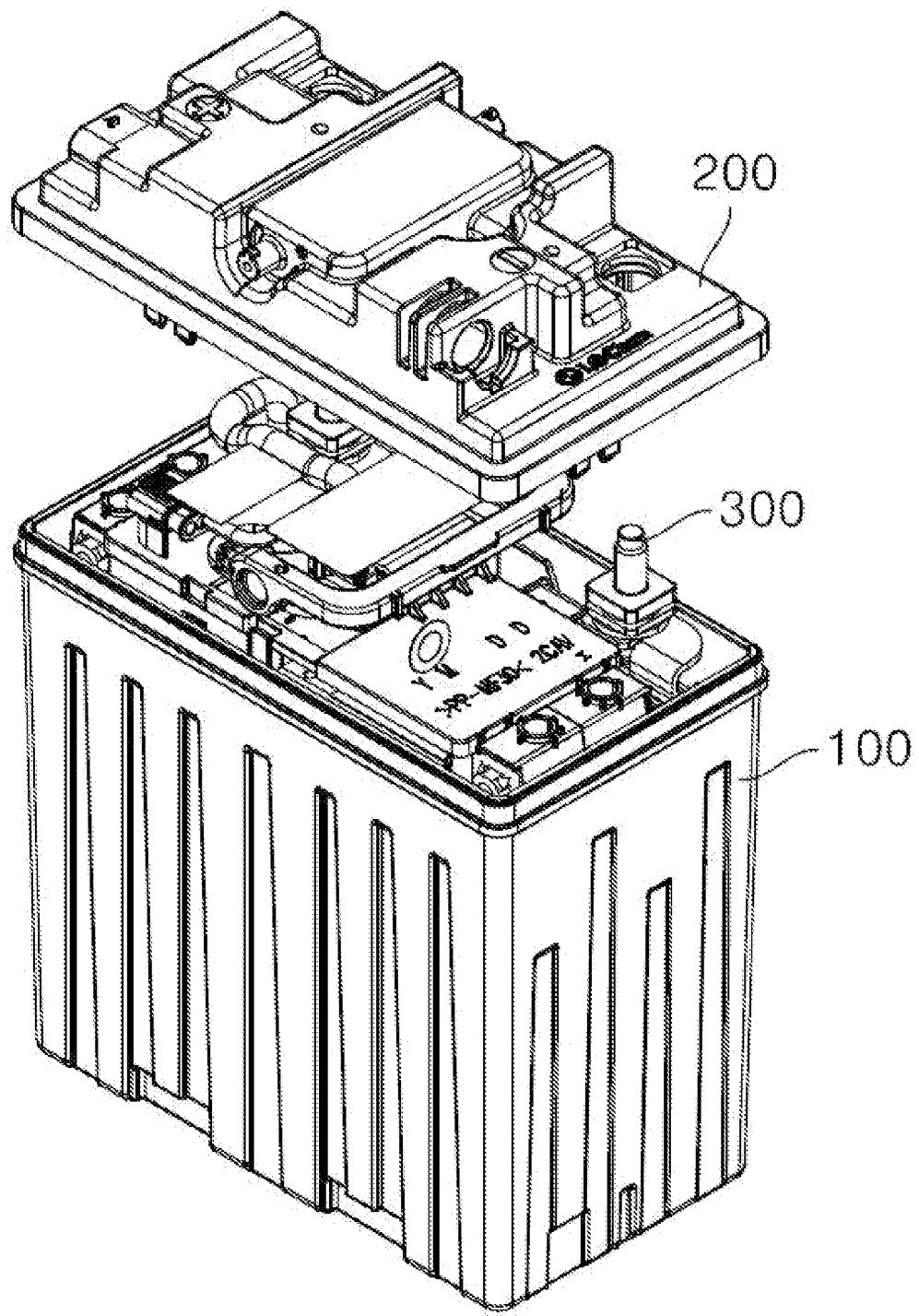

【FIG. 4】
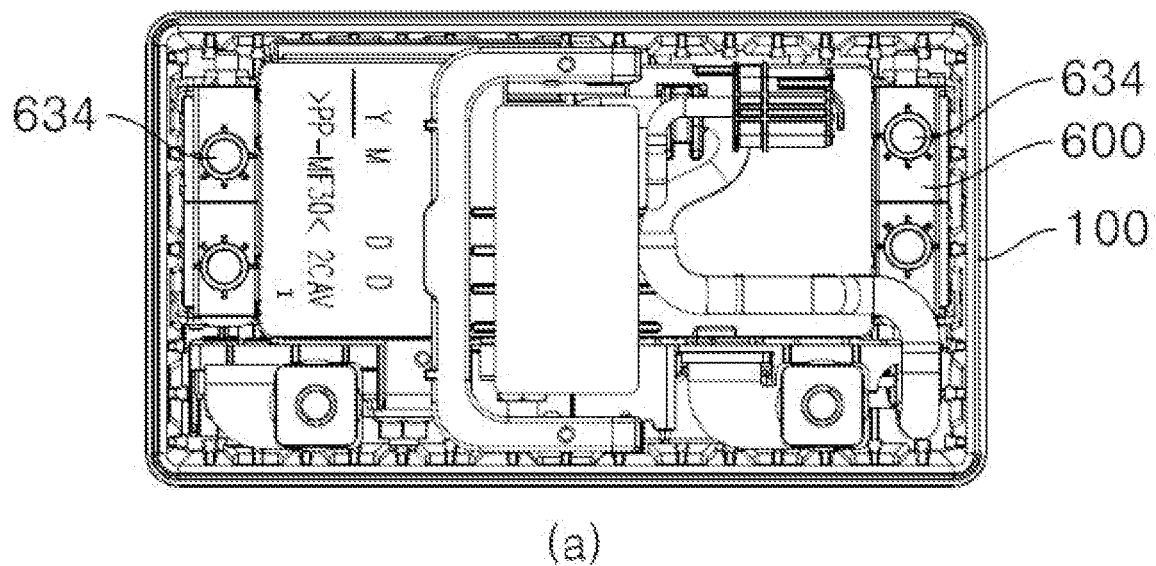
(a)
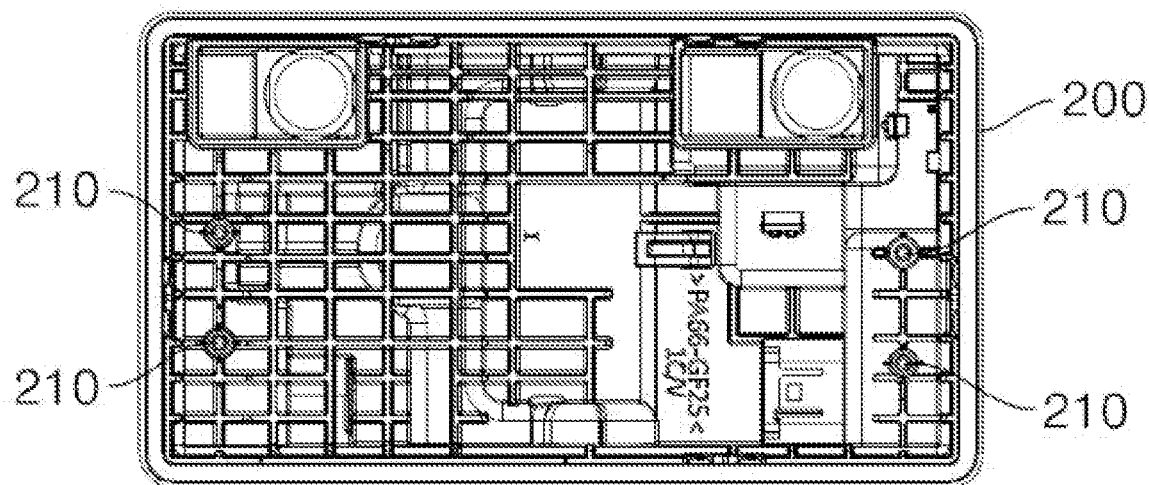
(b)

[FIG. 5]
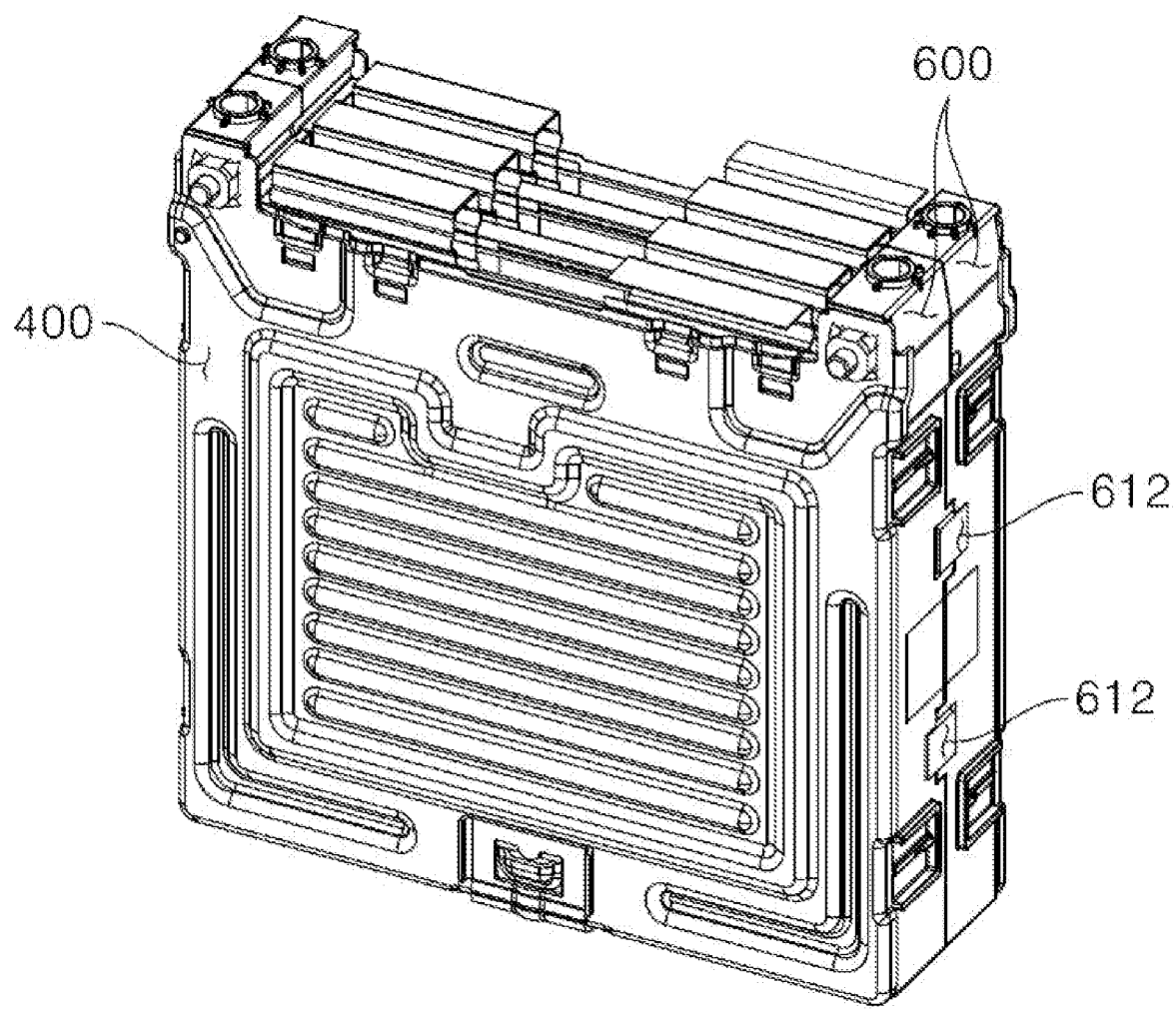

[FIG. 6]
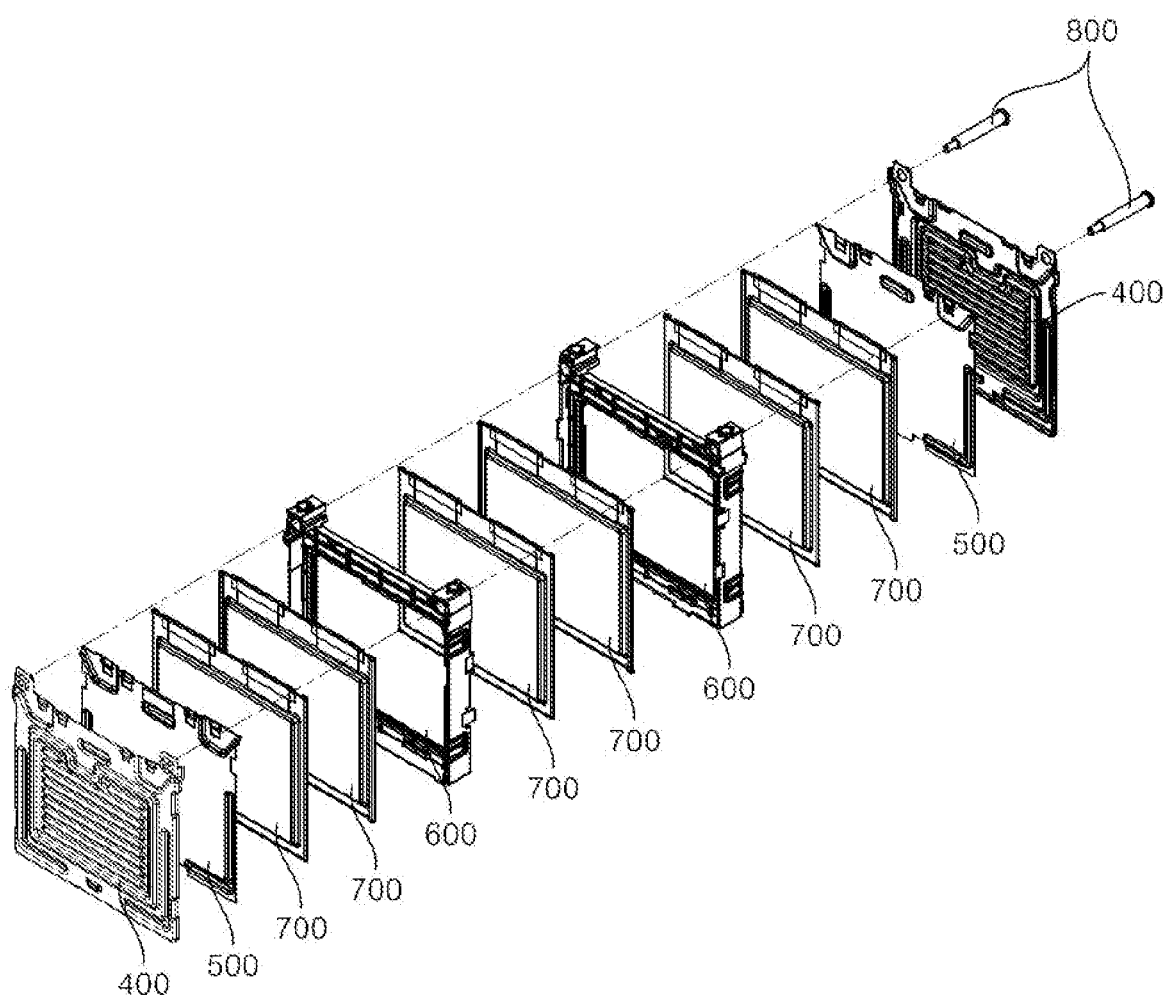

[FIG. 7]
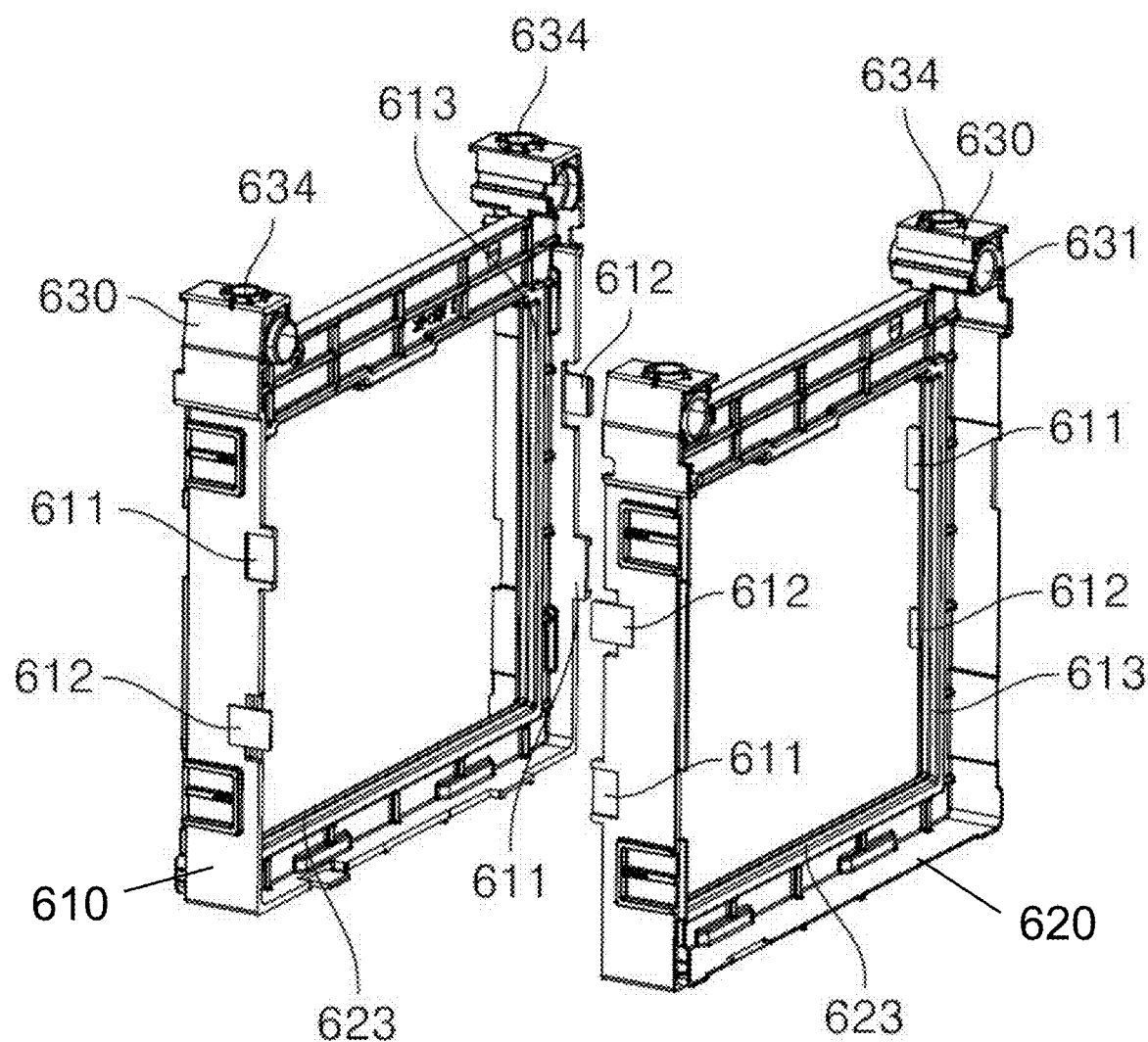

[FIG. 8]
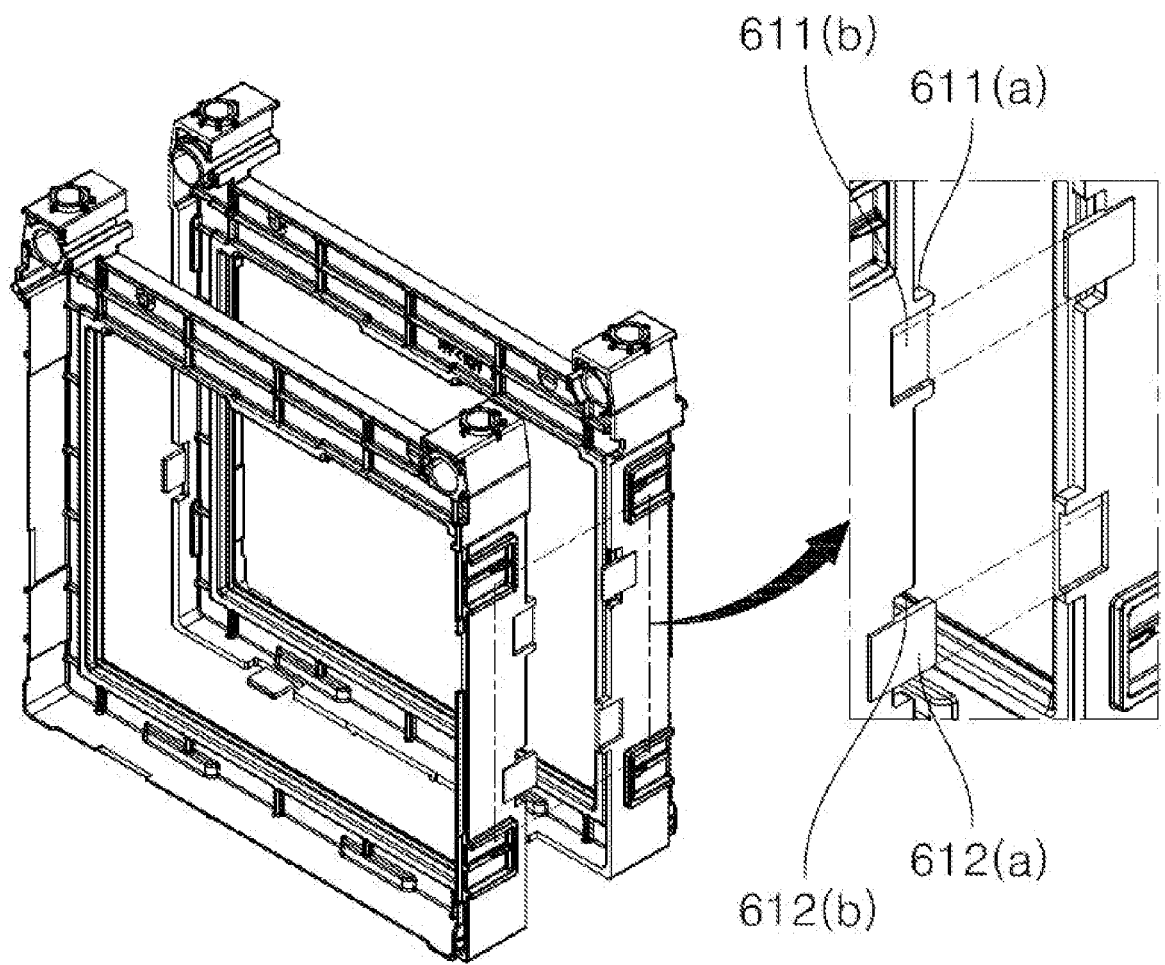

【FIG. 9】
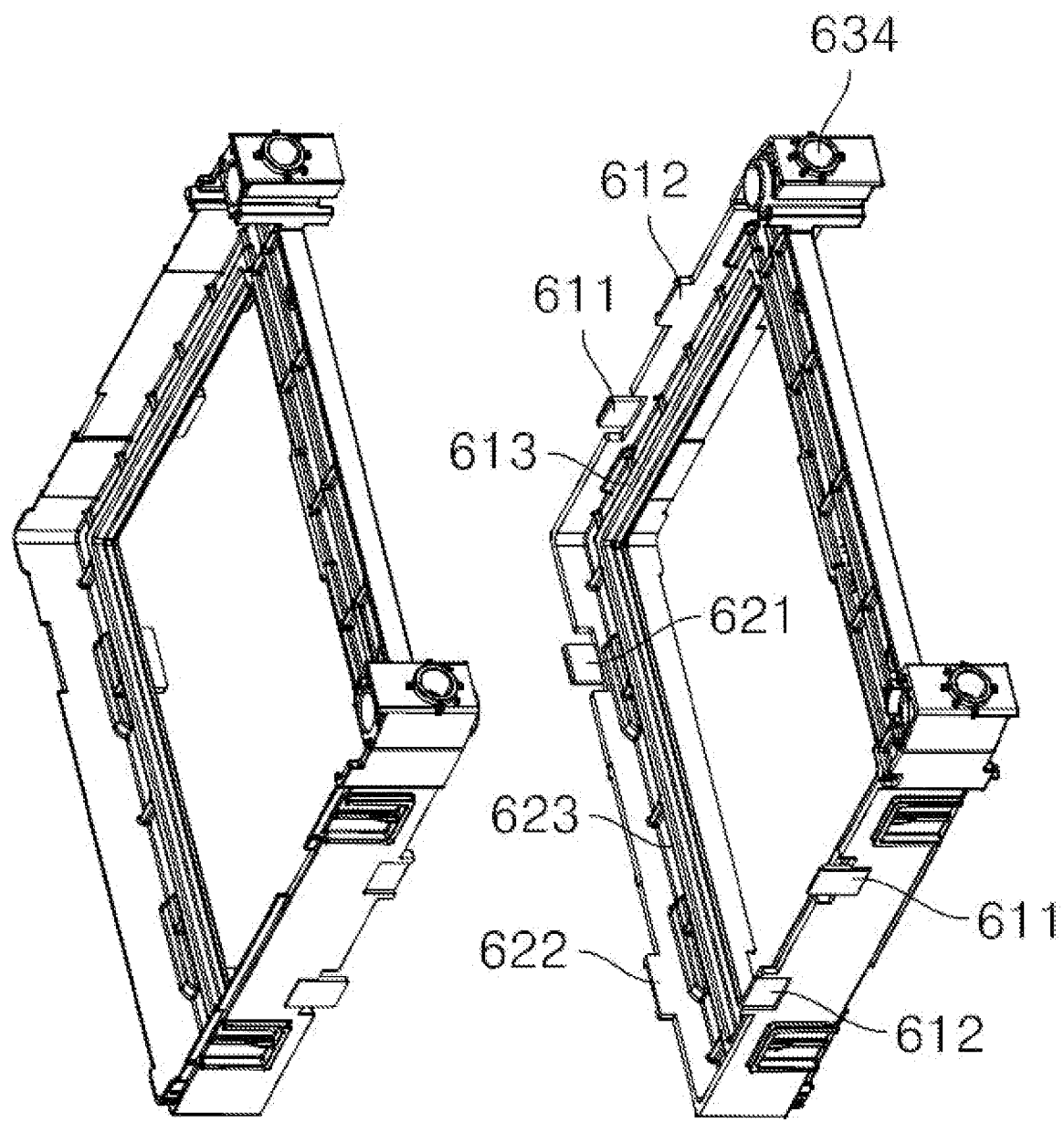

[FIG. 10]
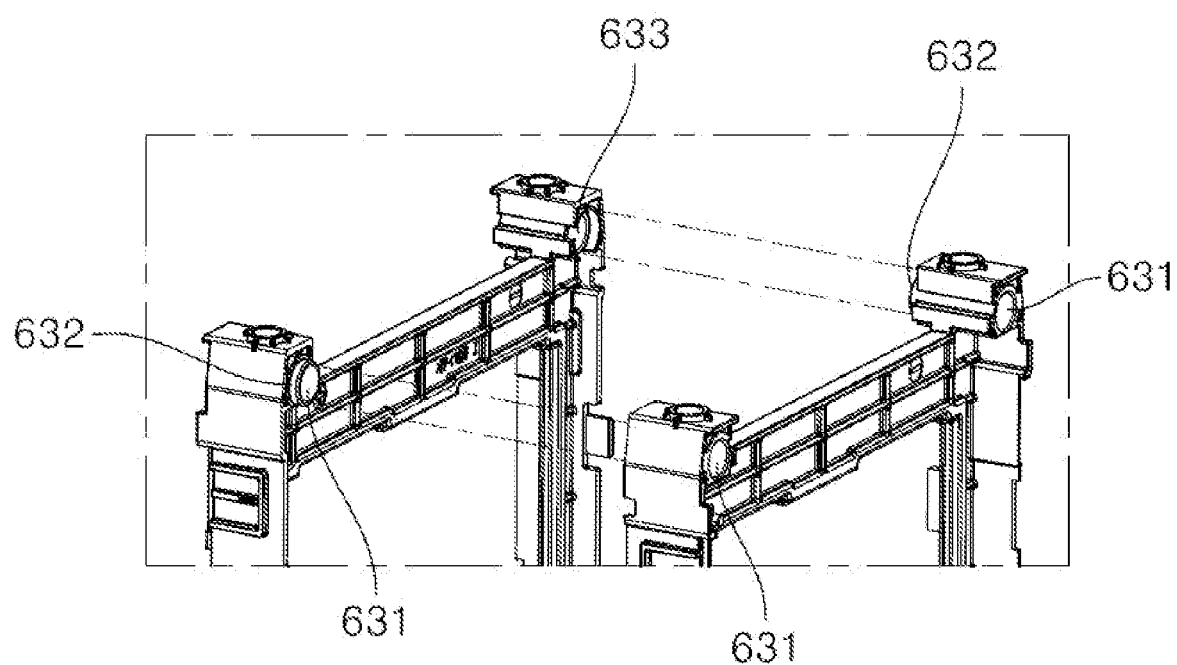

【FIG. 11】
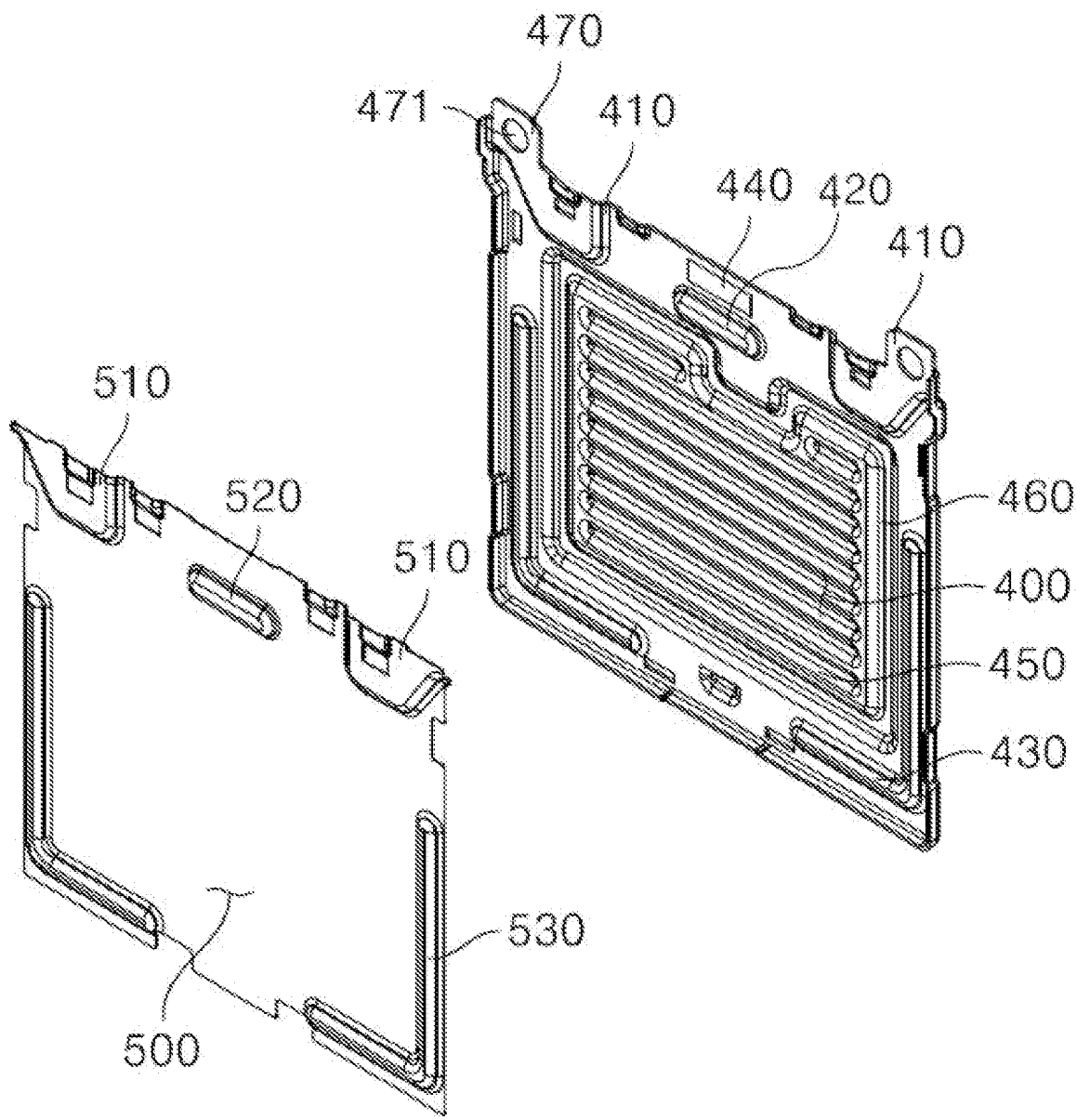

BATTERY MODULE HAVING IMPROVED ENERGY DENSITY AND BATTERY PACK INCLUDING THE SAME

TECHNICAL FIELD

This application claims the benefit of priority to Korean Patent Application No. 2020-0030584 filed on Mar. 12, 2020, the disclosure of which is incorporated herein by reference in its entirety.

The present invention relates to a battery module having improved energy density and a battery pack including the same, and more particularly to a battery module configured such that a support portion is formed at an insulation sheet, whereby it is possible to further receive a battery cell without a cell cartridge and a battery pack including the same.

BACKGROUND ART

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other is used in a vehicle.

In the battery module, a plurality of secondary batteries, i.e. battery cells, is connected to each other in series or in parallel in order to increase capacity and output of the battery module, and various research has been conducted to reduce a dead space in the battery module or to increase the capacity of each battery cell in order to increase the capacity of the battery module.

FIG. 1 is an exploded perspective view of conventional battery module. As shown in FIG. 1, a pair of insulation sheets 20 are located inside a pair of end plates 10 located at the outermost sides of the conventional battery module, and a plurality of unit modules, each of which includes at least one battery cell and a cell cartridge configured to receive the battery cell, is stacked between the pair of insulation sheets 20 to constitute a unit module stack 30.

In the case in which a battery cell is added in order to increase the capacity of the battery module, therefore, a cell cartridge is necessarily needed, which increases the weight of the battery module or a battery pack, whereby energy density thereof is reduced.

Also, in the conventional battery module, each of the end plates 10 and a corresponding one of the insulation sheets 20 are disposed simply in surface contact with each other without being fixed, whereby it is not easy to assemble the battery module.

In Japanese Patent Application Publication No. 2016-046207, an insulation plate is provided between an end plate and a battery holder, and the insulation plate is fixed by connection therebetween through an insertion portion. However, the above problem has still not been solved.

PRIOR ART DOCUMENT (Patent Document 1) Japanese Patent Application Publication No. 2016-046207

DISCLOSURE

Technical Problem

The present invention has been made in view of the above problems, and it is an object of the present invention to provide a battery module configured such that stacking of battery cells is possible without addition of a cell cartridge and a battery pack including the same.

It is another object of the present invention to provide a battery module configured such that an end plate and an insulation sheet can be fixed to each other and a battery pack including the same.

Technical Solution

In order to accomplish the above objects, a battery module according to the present invention includes a unit module stack, in which unit modules include one or more battery cells and a cell cartridge configured to receive the one or more battery cells therein, are horizontally or vertically stacked in a first direction; a pair of insulation sheets located at outermost sides of the unit module stack; and a pair of end plates located outside the pair of insulation sheets, wherein each of the pair of end plates is provided with a first protuberance protruding in the first direction, and each of the pair of insulation sheets is provided with a first receiving portion configured to receive the first protuberance of a corresponding one of the end plates, the first receiving portion having a complimentary shape to the first protuberance.

Also, in the battery module according to the present invention, the first protuberance may be a pair of first protuberances provided in a vicinity of each side of an upper edge of the end plate and the first receiving portion may be pair of first receiving portions.

Also, in the battery module according to the present invention, each of the pair of end plates may be provided with a second protuberance protruding in the first direction, each of the pair of insulation sheets may be provided with a second receiving portion configured to receive the second protuberance of a corresponding one of the end plates, the second receiving portion having a complimentary shape to the second protuberance, the second protuberance may be located between the pair of first protuberances, and the second receiving portion may be located between the pair of first receiving portions.

Also, in the battery module according to the present invention, each of the second protuberance and the second receiving portion may be configured to have the shape of a bar extending by a predetermined length in the first direction.

Also, in the battery module according to the present invention, each of the pair of end plates may be provided with a third protuberance protruding in the first direction, and each of the pair of insulation sheets may be provided with a third receiving portion configured to receive the third protuberance of a corresponding one of the end plates, the third receiving portion having a complimentary shape to the third protuberance.

Also, in the battery module according to the present invention, the third protuberance may be formed along the side edge of the end plate.

Also, in the battery module according to the present invention, the third protuberance may be formed along the side edge and the lower edge of the end plate 400 so as to have an L-shape.

Also, in the battery module according to the present invention, a double-sided tape having a predetermined size may be provided above the second protuberance of the end plate so as to be brought into contact with the insulation sheet.

Also, in the battery module according to the present invention, the first receiving portion, the second receiving portion, and the third receiving portion of the insulation sheet may protrude in the first direction.

Also, in the battery module according to the present invention, one of the battery cells in direct contact with the insulation sheet may be supported by the first receiving portion, the second receiving portion, and the third receiving portion of the insulation sheet.

Also, in the battery module according to the present invention, the end plate may be provided at opposite sides of the upper edge thereof with a pair of first fastening members, each of the first fastening members having a first fastening hole, through which a fastening rod extends, formed therein, and the first fastening member may be formed so as to extend above the upper edge of the insulation sheet.

Also, in the battery module according to the present invention, each cell cartridge of the unit modules may be provided at opposite sides of the upper edge thereof with a pair of second fastening members, each of the second fastening members having a second fastening hole, through which the fastening rod extends, formed therein.

In addition, a battery pack according to the present invention includes the battery module.

An outer surface of a side of each cell cartridge of the unit modules may be provided with a first projection protruding by a predetermined length and a first recess.

In the present invention, one or more constructions that do not conflict with each other may be selected and combined from among the above constructions.

Advantageous Effects

A battery module according to the present invention and a battery pack including the same have a merit in that an end plate and an insulation sheet are provided with a plurality of protuberances and a plurality of receiving portions, respectively, whereby fixing therebetween is possible and assembly is more easily achieved.

In addition, the battery module according to the present invention and the battery pack including the same have an advantage in that the plurality of receiving portions is formed in the insulation sheet, whereby it is possible to further stack battery cells without a separate cell cartridge, and therefore it is possible to improve energy density of the battery module.

DESCRIPTION OF DRAWINGS

FIG. 1 is an exploded perspective view of a conventional battery module.

FIG. 2 is a perspective view of a battery pack according to the present invention.

FIG. 3 is an exploded perspective view of the battery pack according to the present invention.

(a) of FIG. 4 is a plan view of a lower housing according to the present invention and a battery module received therein, and (b) of FIG. 4 is a bottom view of an upper housing.

FIG. 5 is a perspective view of a battery module according to the present invention.

FIG. 6 is an exploded perspective view of the battery module according to the present invention.

FIG. 7 is a perspective view of cell cartridges according to the present invention when viewed from one side.

FIG. 8 is a perspective view of the cell cartridges according to the present invention when viewed from the other side.

FIG. 9 is a perspective view of the cell cartridges according to the present invention when viewed from above.

FIG. 10 is an enlarged view showing the upper parts of the cell cartridges according to the present invention.

FIG. 11 is a perspective view of an insulation sheet and an end plate according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having improved energy density according to the present invention and a battery pack including the same will be described with reference to the accompanying drawings.

FIG. 2 is a perspective view of a battery pack according to the present invention, FIG. 3 is an exploded perspective view of a preferred battery pack according to the present invention, (a) of FIG. 4 is a plan view of a lower housing according to the present invention and a battery module received therein, and (b) of FIG. 4 is a bottom view of an upper housing.

Referring to FIGS. 2 to 4, the battery pack according to the present invention includes a lower housing 100, an upper housing 200 coupled to the lower housing 100, and an output terminal 300 protruding outwards through the upper housing 200 in a state of being connected to the lower housing 100 so as to electrically connect the battery pack to an external device.

The lower housing 100 may include one or more battery modules, an ICB assembly, and a BMS assembly. The battery module includes a plurality of battery cells and cell cartridges. The battery module will be described below.

Meanwhile, the ICB assembly serves to electrically connect the one or more battery modules to each other via an ICB busbar provided therein. The BMS assembly is coupled to the upper end of the ICB assembly in order to protect the battery pack. The ICB assembly and the BMS assembly are commonly known constructions, and therefore a more detailed description thereof will be omitted.

As can be seen from FIGS. 3 and 4, the upper housing 200 is coupled to the upper part of the lower housing 100, in which the one or more battery modules, the ICB assembly, and the BMS assembly are received. The lower surface of the upper housing 200, i.e. the inner bottom surface of the upper housing 200, is provided with a plurality of fastening protrusions 210, which is inserted into third fastening holes 634 of the cell cartridges 600 in order to fix the cell cartridges 600.

Specifically, the fastening protrusions 210 and the third fastening holes 634 of the cell cartridges 600 are provided at corresponding positions such that the fastening protrusions are located respectively in the third fastening holes when the upper housing 200 is coupled to the lower housing 100. It is preferable that the fastening protrusions be formed in the same numbers as the third fastening holes 634.

The fastening protrusions 210 provided on the upper housing 200 may be configured to have the same shape or to have different shapes. In the case in which the fastening protrusions 210 have the same shape, it is possible to easily manufacture the fastening protrusions. In the case in which the fastening protrusions 210 have different shapes, it is possible to adjust coupling force of each fastening protrusion 210 based on the position thereof.

Meanwhile, although the fastening protrusions 210 and the third fastening holes 634 may have a protrusion shape and a hole shape, respectively, the fastening protrusions 210 may have a hole shape and the third fastening holes 634 may have a protrusion shape, irrespective of the names thereof.

A battery module according to the present invention received in the lower housing 100 will be described with reference to FIGS. 5 and 6.

FIG. 5 is a perspective view of a battery module according to the present invention, and FIG. 6 is an exploded perspective view of the battery module according to the present invention.

The battery module according to the present invention may include a unit module stack, in which unit modules, each of which includes one or more battery cells 700 and a cell cartridge 600 configured to receive the battery cells 700 therein, are horizontally or vertically stacked on the basis of the ground, a pair of insulation sheets 500 located at the outermost sides of the unit module stack, and a pair of end plates 400 located outside the pair of insulation sheets 500.

Specifically, an end plate 400, an insulation sheet 500, a battery cell 700, a battery cell 700, a cell cartridge 600, a battery cell 700, a battery cell 700, a cell cartridge 600, a battery cell 700, a battery cell 700, an insulation sheet 500, and an end plate 400 may be stacked in the battery module in that order.

Meanwhile, each battery cell 700 may include an electrode assembly, an electrode lead protruding from the electrode assembly, and a case.

The electrode assembly may be a jelly-roll type electrode assembly, which is configured to have a structure in which a long sheet type positive electrode and a long sheet type negative electrode are wound in the state in which a separator is interposed between the positive electrode and the negative electrode, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other. However, the present invention is not limited thereto.

The electrode assembly is mounted in the case. The case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which is disposed so as to abut the inner layer, corresponds to a barrier layer configured to prevent moisture or various kinds of gas from permeating into the battery from the outside. Aluminum foil, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

The electrode lead may be configured to have a structure in which the electrode lead is exposed outwards from the case in the state in which electrode tabs of the electrode assembly are electrically connected to the electrode lead or may be configured to have a structure in which the electrode lead directly connects the electrode assembly to the outside of the case in the state in which there are no electrode tabs. However, the present invention is not limited thereto. The battery cells correspond to commonly known constructions, and therefore a more detailed description thereof will be omitted.

A plurality of battery cells 700 may be stacked through the cell cartridges 600. The cell cartridges 600 are shown in FIGS. 7 to 10.

FIG. 7 is a perspective view of cell cartridges according to the present invention when viewed from one side, and FIG. 8 is a perspective view of the cell cartridges according to the present invention when viewed from the other side.

In the battery module according to the present invention, the cell cartridges 600 may have the same external shape and size. That is, each of the cell cartridges 600 according to the present invention may include a pair of vertical frames 610 opposite each other in a state of being spaced apart from each other by a predetermined distance, a pair of horizontal frames 620 configured respectively to connect upper ends and lower ends of the pair of vertical frames 610 to each other, and a pair of second fastening members 630 formed in the vicinity of corners at which the upper ends of the pair of vertical frames 610 and a corresponding one of the horizontal frames 620 join so as to extend upwards by a predetermined height.

First, the vertical frames 610 will be described in more detail. Each vertical frame 610, which has an approximately flat structure, is provided with a first coupling member 611 and a second coupling member 612 formed so as to face in one direction in a state of being spaced apart from each other by a predetermined distance. In the pair of vertical frames 610, the first coupling members 611 and the second coupling members 612 may be located in diagonal directions.

That is, as shown in FIGS. 7 and 8, in the cell cartridges 600 according to the present invention, the first coupling members 611 and the second coupling members 612 are located in diagonal directions such that the same kinds of cell cartridges can be coupled to each other in a state of facing each other.

The first coupling member 611 includes a first coupling protrusion 611(*a*) protruding by a predetermined length more than the edge of the vertical frame 610 and a first coupling tight-contact recess 611(*b*) formed in the outer surface of the first coupling protrusion 611(*a*) so as to be depressed by a predetermined depth. The second coupling member 612 may include a second coupling protrusion 612(*a*) seated in the first coupling tight-contact recess 611(*b*) in a state of protruding by a predetermined length more than the edge of the vertical frame 610 and a second coupling insertion recess 612(*b*) configured to receive the first coupling protrusion 611(*a*).

Consequently, when a plurality of battery cells 700 is received in an inner space defined by the vertical and horizontal frames 610 and 620 of one cell cartridge 600 and then a pair of cell cartridges 600 is brought into tight contact with each other, the second coupling protrusions 612(*a*) are seated in the first coupling tight-contact recesses 611(*b*) and the first coupling protrusions 611(*a*) are inserted into the second coupling insertion recesses 612(*b*), whereby a unit module stack capable of inhibiting movement of the cell cartridges 600 upwards, downwards, leftwards, and rightwards may be obtained.

Meanwhile, each of the pair of vertical frames 610 and a lower one of the horizontal frames 620 are provided with a first inner extension portion 613 and a second inner extension portion 623, respectively. When two battery cells 700 are received in a cell cartridge 600, these extension portions partition the battery cells 700 from each other.

FIG. 9 is a perspective view of the cell cartridges according to the present invention when viewed from above. In order to increase the force of coupling between the cell cartridges 600, the horizontal frame 620 may be further provided with a third coupling member 621 and a fourth coupling member 622. Specifically, the third coupling member 621 and the fourth coupling member 622 are located at the lower horizontal frame 620. The third coupling member 621 and the fourth coupling member 622 protrude in one direction, more specifically in the same direction as the direction in which the first coupling member 611 and the second coupling member 612 protrude, and are located in a state of being spaced apart from each other by a predetermined distance.

Here, the third coupling member 621 includes a third coupling protrusion protruding by a predetermined length more than the edge of the horizontal frame 620 and a third coupling tight-contact recess formed in the outer surface of the third coupling protrusion so as to be depressed by a predetermined depth. The fourth coupling member 622 may include a fourth coupling protrusion seated in the third coupling tight-contact recess in a state of protruding by a predetermined length more than the edge of the horizontal frame 620 and a fourth coupling insertion recess configured to receive the third coupling protrusion. These coupling members are identical in external appearance and coupling structure to the first coupling members 611 and the second coupling members 612, and therefore a further description thereof will be omitted.

FIG. 10 is an enlarged view showing the upper parts of the cell cartridges according to the present invention. In each of the cell cartridges 600 according to the present invention, the pair of second fastening members 630 is located in the vicinity of corners at which the upper ends of the pair of vertical frames 610 and the upper horizontal frame 620 join, and protrudes upwards more than the upper horizontal frame 620.

The pair of second fastening members 630 is configured to fix the cell cartridges 600, the battery cells 700, the insulation sheets 500, and the end plates 400 to each other in the state in which the battery cells, the insulation sheets, and the end plates are stacked in front of and at the rear of the cell cartridges.

Specifically, each of the second fastening members 630 may include a second fastening hole 631, a fifth coupling protrusion 632, a step portion 633, and a third fastening hole 634.

The second fastening hole 631 provides a space through which a fastening rod 800 extends, and is formed in a horizontal direction corresponding to the front and the rear of the cell cartridge 600.

The fifth coupling protrusion 632 and the step portion 633 are configured to increase the force of coupling between the pair of cell cartridges 600 when the cell cartridges are brought into tight contact with each other. The fifth coupling protrusion 632 extends outwards by a predetermined length along the outer diameter of the second fastening hole 631, whereas the step portion 633 is formed outside the second fastening hole 631 opposite the side at which the fifth coupling protrusion 632 is formed. Of course, the inner diameter of the step portion 633 is greater than the inner diameter of the second fastening hole 631 so as not to interfere with the fastening rod 800.

Meanwhile, in the pair of second fastening members 630, the fifth coupling protrusion 632 and the step portion 633 are located in opposite directions. That is, in the case in which one of the second fastening members 630 is formed such that the fifth coupling protrusion 632 faces the front and the step portion 633 faces the rear, the fifth coupling protrusion 632 of the other second fastening member 630 faces the rear and the step portion 633 of the other second fastening member faces the front.

When the pair of cell cartridges 600 are brought into tight contact with each other, therefore, the fifth coupling protrusion 632 formed on any one of the cell cartridges 600 is inserted into the second fastening hole 631 of the other cell cartridge 600, which is coupled to the one of the cell cartridges while facing each other.

As described above, the third fastening hole 634 is configured to receive a corresponding one of the fastening protrusions 210 of the upper housing 200 (see FIGS. 4 and 9), and is formed in the upper end of the second fastening member 630, i.e. in the second fastening member 630 in a vertical direction.

Next, the end plate and the insulation sheet will be described. FIG. 11 is a perspective view of an insulation sheet and an end plate according to the present invention.

First, the end plate 400 will be described. The end plate, which is located at each of the outermost sides of the battery module and which has an approximately flat structure, includes a first protuberance 410, a second protuberance 420, a third protuberance 430, a double-sided tape 440, a horizontal bent portion 450, a vertical bent portion 460, and a first fastening member 470.

The first protuberance 410 is provided in the vicinity of each side of the upper edge of the end plate 400, and may minimize movement of the insulation sheet 500 when brought into tight contact therewith.

That is, the first protuberance 410 is configured to have a projection formed at the lower part thereof while protruding in a direction toward the insulation sheet 500.

The second protuberance 420, which is configured to have the shape of a long bar having a predetermined length in the horizontal direction, is located between the pair of first protuberances 410, and is formed so as to protrude in the direction toward the insulation sheet 500, in the same manner as the first protuberance 410.

A pair of third protuberances 430 may be formed along the side edge of the end plate 400. For example, each of the third protuberances may be formed in the vicinity of a corner at which the vertical edge and the horizontal edge of the end plate 400 join so as to have an L-shape.

The double-sided tape 440 is located in the vicinity of the second protuberance 420, e.g. above the second protuberance 420, to increase the force of tight contact with the insulation sheet 500.

A plurality of horizontal bent portions 450 and a plurality of vertical bent portions 460 are configured to improve heat dissipation through an increase in surface area and at the same time to prevent deformation of the battery module when impact is applied thereto leftwards, rightwards, upwards, and downwards.

The first fastening member 470 is provided at opposite sides of the upper edge of the end plate, and has a first fastening hole 471, through which the fastening rod 800 extends, formed therein. Here, it is preferable that the first fastening member 470 be formed so as to extend upwards more than the upper edge of the insulation sheet 500.

The insulation sheet 500 is located at the inner surface of each of the pair of end plates 400 and has an approximately flat structure. One surface of the insulation sheet is brought into tight contact with the end plate 400, and the other surface of the insulation sheet abuts the battery cell 700.

Specifically, the insulation sheet 500 includes first receiving portions 510, a second receiving portion 520, and third receiving portions 530. The first receiving portions 510 receive the first protuberances 410 of the end plate 400, the second receiving portion 520 receives the second protuberance 420 of the end plate 400, and the third receiving portions 530 receive the third protuberances 430 of the end plate 400.

When the end plate 400 and the insulation sheet 500 are brought into tight contact with each other, therefore, the side edges of the end plate and the insulation sheet as well as the upper edges of the end plate and the insulation sheet are securely brought into tight contact with each other, whereby the force of coupling therebetween may be increased.

Here, the first receiving portions 510, the second receiving portion 520, and the third receiving portions 530 of the insulation sheet 500 are identical in shape to the first protuberances 410, the second protuberance 420, and the third protuberances 430 of the end plate 400, respectively. These receiving portions correspond to spaces configured to receive the protuberances and thus are in protruding states, although the term "receiving portions" is used.

Meanwhile, the battery cell 700 may be seated in a space defined by the first receiving portions 510, the second receiving portion 520, and the third receiving portions 530 of the insulation sheet 500.

That is, three edges of the battery cell 700 may be supported by the pair of third receiving portions 530, each of which is formed so as to have an L-shape, and the other edge of the battery cell may be supported by the pair of the first receiving portions 510 and the second receiving portion 520.

Conventionally, a cell cartridge is needed to mount the battery cell 700. However, the battery module according to the present invention has an advantage in that it is possible to further mount the battery cell 700 through the receiving portions of the insulation sheet 500, whereby it is possible to increase energy density of the battery module.

Meanwhile, the fastening rods 800 extend through the first fastening holes 471 of the end plates 400 and the second fastening holes 631 of the cell cartridges 600 and are then fixed.

The battery pack having the above construction may be applied to various kinds of devices, for example, a vehicle, such as an electric vehicle or a hybrid electric vehicle.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

10: End plate
20: Insulation sheet
30: Unit module stack
100: Lower housing
200: Upper housing
210: Fastening protrusion
300: Output terminal
400: End plate
410: First protuberance
420: Second protuberance
430: Third protuberance
440: Double-sided tape
450: Horizontal bent portion
460: Vertical bent portion
470: First fastening member 471: First fastening hole
500: Insulation sheet
510: First receiving portion
520: Second receiving portion
530: Third receiving portion
600: Cell cartridge
610: Vertical frame
611: First coupling member
611(a): First coupling protrusion 611(b): First coupling tight-contact recess
612: Second coupling member
612(a): Second coupling protrusion 612(b): Second coupling insertion recess
613: First inner extension portion
620: Horizontal frame
621: Third coupling member
621(a): Third coupling protrusion 621(b): Third coupling tight-contact recess
622: Fourth coupling member
622(a): Fourth coupling protrusion 622(b): Fourth coupling insertion recess

623: Second inner extension portion
630: Second fastening member
631: Second fastening hole 632: Fifth coupling protrusion
633: Step portion 634: Third fastening hole
700: Battery cell
800: Fastening rod

The invention claimed is:

1. A battery module comprising:
a unit module stack, in which unit modules comprising one or more battery cells and a cell cartridge configured to receive the one or more battery cells therein, are horizontally or vertically stacked in a first direction;
a pair of insulation sheets located at outermost sides of the unit module stack; and
a pair of end plates located outside the pair of insulation sheets,
wherein each of the pair of end plates is provided with a first protuberance at an edge of each of the end plates protruding in the first direction, and
wherein each of the pair of insulation sheets is provided with a first receiving portion at an edge of each of the pair of insulation sheets configured to receive the first protuberance of a corresponding one of the end plates, the first receiving portion having a complimentary shape to the first protuberance.

2. The battery module according to claim 1, wherein the first protuberance is a pair of first protuberances provided in a vicinity of each side of an upper edge of each end plate and the first receiving portion is a pair of first receiving portions.

3. The battery module according to claim 2, wherein each of the pair of end plates is provided with a second protuberance protruding in the first direction,
wherein each of the pair of insulation sheets is provided with a second receiving portion configured to receive the second protuberance of a corresponding one of the end plates, the second receiving portion having a complimentary shape to the second protuberance, and
wherein the second protuberance is located between the pair of first protuberances and the second receiving portion is located between the pair of first receiving portions.

4. The battery module according to claim 3, wherein each of the second protuberance and the second receiving portion is configured to have a shape of a bar extending by a predetermined length in the first direction.

5. The battery module according to claim 4, wherein each of the pair of end plates is provided with a third protuberance protruding in the first direction, and
wherein each of the pair of insulation sheets is provided with a third receiving portion configured to receive the third protuberance of a corresponding one of the end plates, the third receiving portion having a complimentary shape to the third protuberance.

6. The battery module according to claim 5, wherein the third protuberance is formed along a side edge of the end plate.

7. The battery module according to claim 5, wherein the third protuberance is formed along a side edge and a lower edge of the end plate so as to have an L-shape.

8. The battery module according to claim 4, wherein a double-sided tape having a predetermined size is provided above the second protuberance of the end plate so as to be brought into contact with each of the pair of insulation sheets.

9. The battery module according to claim 7, wherein the first receiving portion, the second receiving portion, and the third receiving portion of each of the pair of insulation sheets protrude in the first direction.

10. The battery module according to claim 9, wherein one of the battery cells in direct contact with the insulation sheet is supported by the first receiving portion, the second receiving portion, and the third receiving portion of the insulation sheet.

11. The battery module according to claim 10, wherein each end plate is provided at opposite sides of the upper edge thereof with a pair of first fastening members, each of the first fastening members having a first fastening hole, through which a fastening rod extends, formed therein, and
wherein each first fastening member is formed so as to extend above an upper edge of the insulation sheet.

12. The battery module according to claim 11, wherein each cell cartridge of the unit modules is provided at opposite sides of an upper edge thereof with a pair of second fastening members, each of the second fastening members having a second fastening hole, through which the fastening rod extends, formed therein.

13. A battery pack comprising the battery module according to claim 1.

14. The battery module according to claim 1, wherein an outer surface of a side of each cell cartridge of the unit modules is provided with a first projection protruding by a predetermined length and a first recess.

15. The battery module according to claim 1, wherein each end plate is provided at opposite sides of the upper edge thereof with a pair of first fastening holes, the pair of first fastening holes being formed in the first protuberance.

16. The battery module according to claim 1, wherein the first receiving portion is formed at a top edge of each of the pair of insulation sheets.

17. The battery module according to claim 2, wherein the pair of first receiving portions is formed at a top edge of each of the pair of insulation sheets, and
wherein the second receiving portion between and below the pair of first receiving portions.

* * * * *